(12) United States Patent
Gehin-Scott, Jr. et al.

(10) Patent No.: US 10,929,355 B1
(45) Date of Patent: Feb. 23, 2021

(54) BUNDLED DISTRIBUTION AND MANAGEMENT OF AERONAUTICAL DATA

(71) Applicant: Foreflight LLC, Houston, TX (US)

(72) Inventors: Charles Gehin-Scott, Jr., Saco, ME (US); Travis Scott Clayton Root, Austin, TX (US)

(73) Assignee: Foreflight LLC, Houston, TX (US)

( * ) Notice: Subject to any disclaimer, the term of this patent is extended or adjusted under 35 U.S.C. 154(b) by 0 days.

(21) Appl. No.: 16/714,352

(22) Filed: Dec. 13, 2019

(51) Int. Cl.
| | |
|---|---|
| *G06F 16/185* | (2019.01) |
| *G08G 5/00* | (2006.01) |
| *G06F 3/0482* | (2013.01) |
| *G06F 16/29* | (2019.01) |
| *G06F 16/16* | (2019.01) |
| *G06F 16/13* | (2019.01) |

(52) U.S. Cl.
CPC .......... *G06F 16/185* (2019.01); *G06F 3/0482* (2013.01); *G06F 16/13* (2019.01); *G06F 16/162* (2019.01); *G06F 16/164* (2019.01); *G06F 16/29* (2019.01); *G08G 5/0047* (2013.01)

(58) Field of Classification Search
None
See application file for complete search history.

(56) References Cited

U.S. PATENT DOCUMENTS

| | | | |
|---|---|---|---|
| 2014/0106333 A1* | 4/2014 | Dugan | G07C 5/0825 434/428 |
| 2015/0006078 A1* | 1/2015 | Dorfmann | G01C 23/00 701/533 |
| 2015/0187232 A1* | 7/2015 | Bailiang | G09B 29/007 701/532 |
| 2019/0019419 A1* | 1/2019 | Gannon | G09B 5/02 |
| 2020/0168104 A1* | 5/2020 | Holder | G01C 23/005 |
| 2020/0320446 A1* | 10/2020 | Dahl | G06Q 10/025 |

* cited by examiner

*Primary Examiner* — Toan H Vu
(74) *Attorney, Agent, or Firm* — Ferguson Braswell Fraser Kubasta PC

(57) ABSTRACT

A mobile flight application obtains, via a network, a content pack having aeronautical files, and determines a set of waypoints in the content pack from the aeronautical files in the content pack. In a geolocation mapping structure, a waypoint is related with a matching subset of the aeronautical files in the content pack. Integrated into the corresponding sections of a user interface of the mobile flight application, the content pack is presented while maintaining inseparability of the files in the mobile flight application.

20 Claims, 11 Drawing Sheets

| Name | Date Modified | Size | Kind |
|---|---|---|---|
| ▼ 🗀 Byop | Today at 10:56 AM | – | folder |
|   KHOU_Airport...Diagram 2.PDF | Sep 19, 2018 at 3:39 PM | 208 KB | PDF Document |
|   KHOU_Airport...Diagram 3.PDF | Sep 19, 2018 at 3:39 PM | 208 KB | PDF Document |
|   KHOU_Airport...Diagram 4.PDF | Sep 19, 2018 at 3:39 PM | 208 KB | PDF Document |
|   KHOU_Airport...rt Diagram.PDF | Sep 19, 2018 at 3:39 PM | 208 KB | PDF Document |
|   KHOU_approa...RWY 31L 2.PDF | Sep 19, 2018 at 3:40 PM | 241 KB | PDF Document |
|   KHOU_approa...RWY 31L 3.PDF | Sep 19, 2018 at 3:40 PM | 241 KB | PDF Document |
|   KHOU_approa...RWY 31L 4.PDF | Sep 19, 2018 at 3:40 PM | 241 KB | PDF Document |
|   KHOU_approa...RWY 31L .PDF | Sep 19, 2018 at 3:40 PM | 241 KB | PDF Document |
|   KHOU_depart...inimums 2.PDF | Sep 19, 2018 at 3:40 PM | 43 KB | PDF Document |
|   KHOU_depart...inimums 3.PDF | Sep 19, 2018 at 3:40 PM | 43 KB | PDF Document |
|   KHOU_Airport...Diagram 4.PDF | Sep 19, 2018 at 3:40 PM | 43 KB | PDF Document |
| ▼ 🗀 Layers | Nov 26, 2018 at 5:15 PM | – | folder |
|   alexdawsonschool.mbtiles | Nov 26, 2018 at 4:56 PM | 1.2 MB | Image Formats |
|   basecamp.mbtiles | Nov 26, 2018 at 4:52 PM | 2.7 MB | Image Formats |
|   carlstromfield.mbtiles | Nov 26, 2018 at 4:27 PM | 1 MB | Image Formats |
|   coramairport.mbtiles | Nov 26, 2018 at 4:45 PM | 4 MB | Image Formats |
|   nalffentress.mbtiles | Nov 26, 2018 at 4:41 PM | 2.3 MB | Image Formats |
|   naskingsvillesouth.mbtiles | Nov 26, 2018 at 4:48 PM | 2.2 MB | Image Formats |
|   piccolofield.mbtiles | Nov 26, 2018 at 4:33 PM | 1.1 MB | Image Formats |
|   pungoouter.mbtiles | Nov 26, 2018 at 5:06 PM | 4 MB | Image Formats |
|   rooseveltfield.mbtiles | Nov 26, 2018 at 5:09 PM | 840 KB | Image Formats |
|   sanjuanlandingstrip.mbtiles | Nov 26, 2018 at 5:15 PM | 348 KB | Image Formats |
|   westshemyaaaf.mbtiles | Nov 26, 2018 at 5:00 PM | 2.2 MB | Image Formats |
| 🗎 Manifest | Nov 26, 2018 at 5:15 PM | 163 bytes | JSON |
| ▼ 🗀 Navdata | Nov 28, 2018 at 2:43 PM | – | folder |
|   Abandoned Airfields.kml | Nov 26, 2018 at 5:28 PM | 12 KB | Google...cument |
|   Alexander_Da...rfields-Freeman | Nov 26, 2018 at 4:10 PM | 4.1 MB | PDF Document |
|   Alexander_Da...l_AirfieldHangar | Nov 26, 2018 at 3:56 PM | 55 KB | PDF Document |
|   Basecamp_Air...amland Resort | Nov 26, 2018 at 4:07 PM | 1.3 MB | PDF Document |
|   Carlstrom_FieldWikipedia.pdf | Nov 26, 2018 at 3:30 PM | 222 KB | PDF Document |
|   Coram_AirportAerial Image 1 | Nov 26, 2018 at 3:56 PM | 117 KB | PDF Document |
|   Coram_AirportCub (1980) | Nov 26, 2018 at 3:55 PM | 110 KB | PDF Document |
|   Coram_Airport...District History | Nov 26, 2018 at 4:06 PM | 3.1 MB | PDF Document |
|   NALF_FentressAerial Image 1 | Nov 26, 2018 at 3:53 PM | 54 KB | PDF Document |
|   NALF_FentressAerial Image 2 | Nov 26, 2018 at 3:53 PM | 87 KB | PDF Document |
|   NALF_FentressWikipedia.pdf | Nov 26, 2018 at 4:04 PM | 149 KB | PDF Document |
|   NAS_Kingsville...ned A-4 Aerial | Nov 26, 2018 at 3:52 PM | 85 KB | PDF Document |
|   NAS_Kingsville...ed A-4 Ground | Nov 26, 2018 at 3:51 PM | 56 KB | PDF Document |
|   NAS_Kingsville...ields-Freeman | Nov 26, 2018 at 3:59 PM | 2.5 MB | PDF Document |
|   Piccolo_FieldWikipedia.pdf | Nov 26, 2018 at 3:32 PM | 190 KB | PDF Document |
|   Pungo_Outer_...rfields-Freeman | Nov 26, 2018 at 4:04 PM | 1.6 MB | PDF Document |
|   Roosevelt_Fiel...ergh Takes Off | Nov 26, 2018 at 3:52 PM | 69 KB | PDF Document |
|   Roosevelt_FieldWikipedia.pdf | Nov 26, 2018 at 3:24 PM | 225 KB | PDF Document |
|   San_Juan_Cou...fields-Freeman | Nov 26, 2018 at 4:16 PM | 2.9 MB | PDF Document |
|   The Big Texan...nch - Wikipedia | Nov 26, 2018 at 2:43 PM | 423 KB | Web archive |
|   West_Shemay_...ldAerial Image | Nov 26, 2018 at 3:56 PM | 43 KB | PDF Document |

*FIG. 5.1*

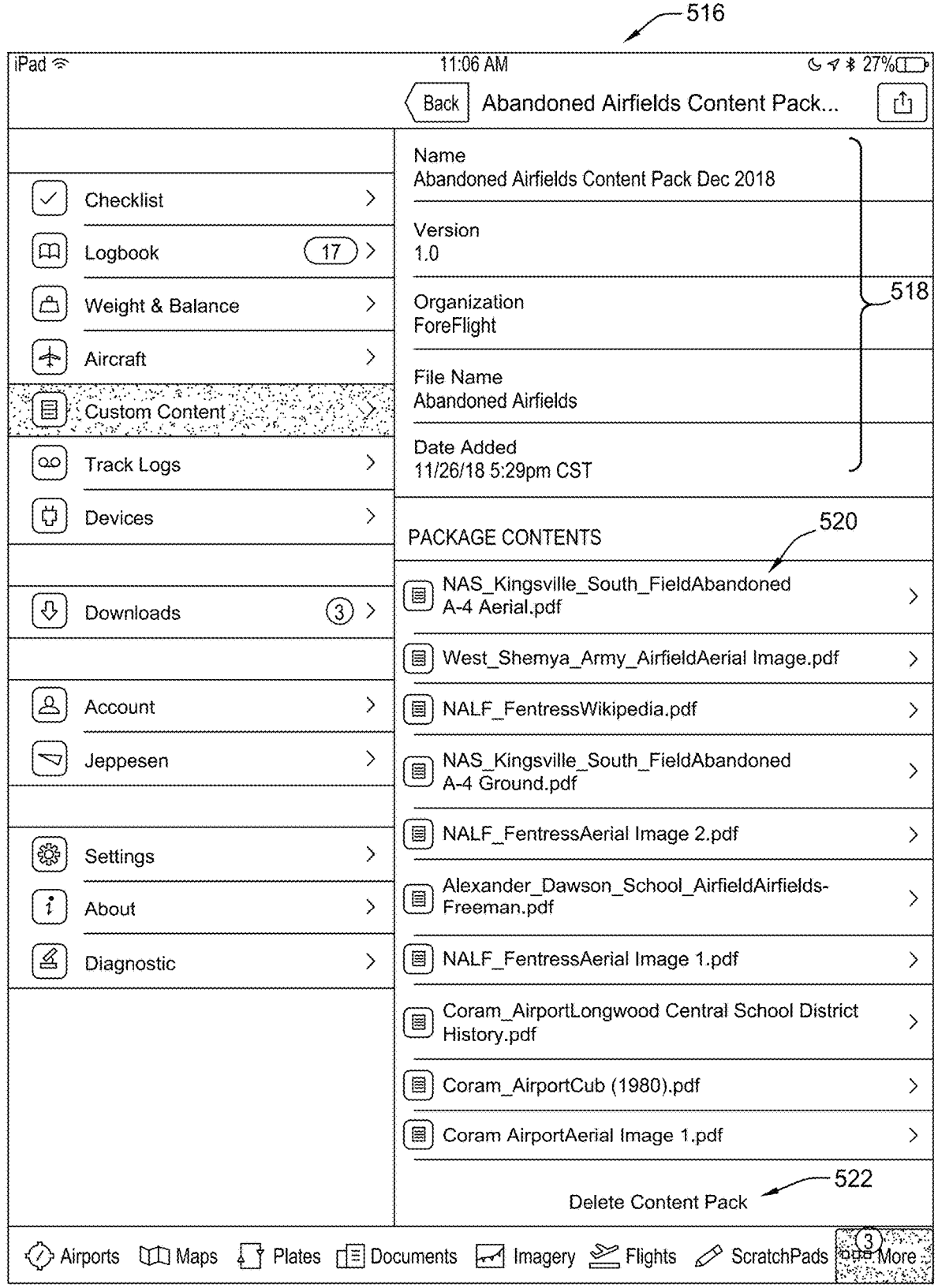
FIG. 5.2

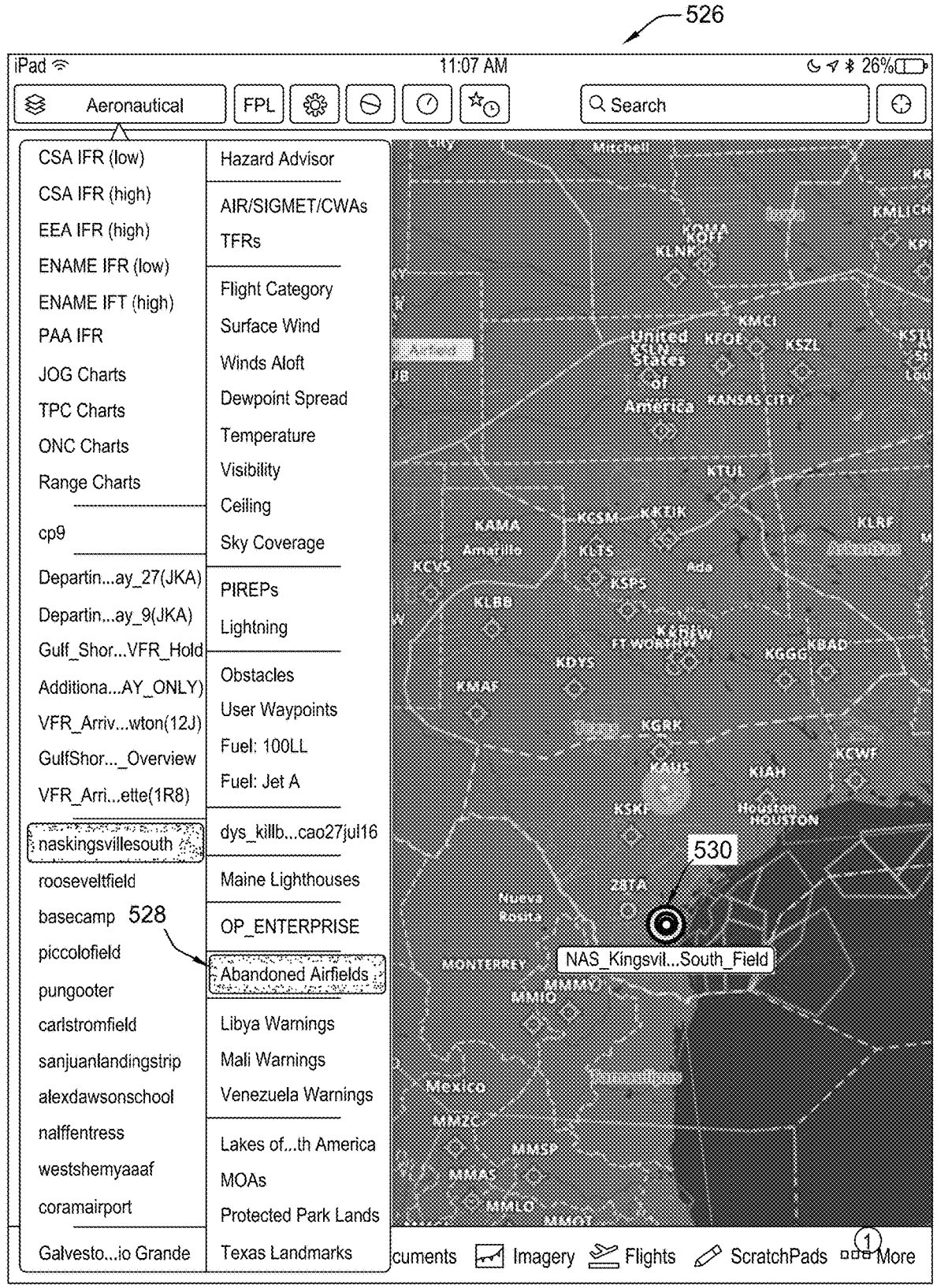
FIG. 5.3

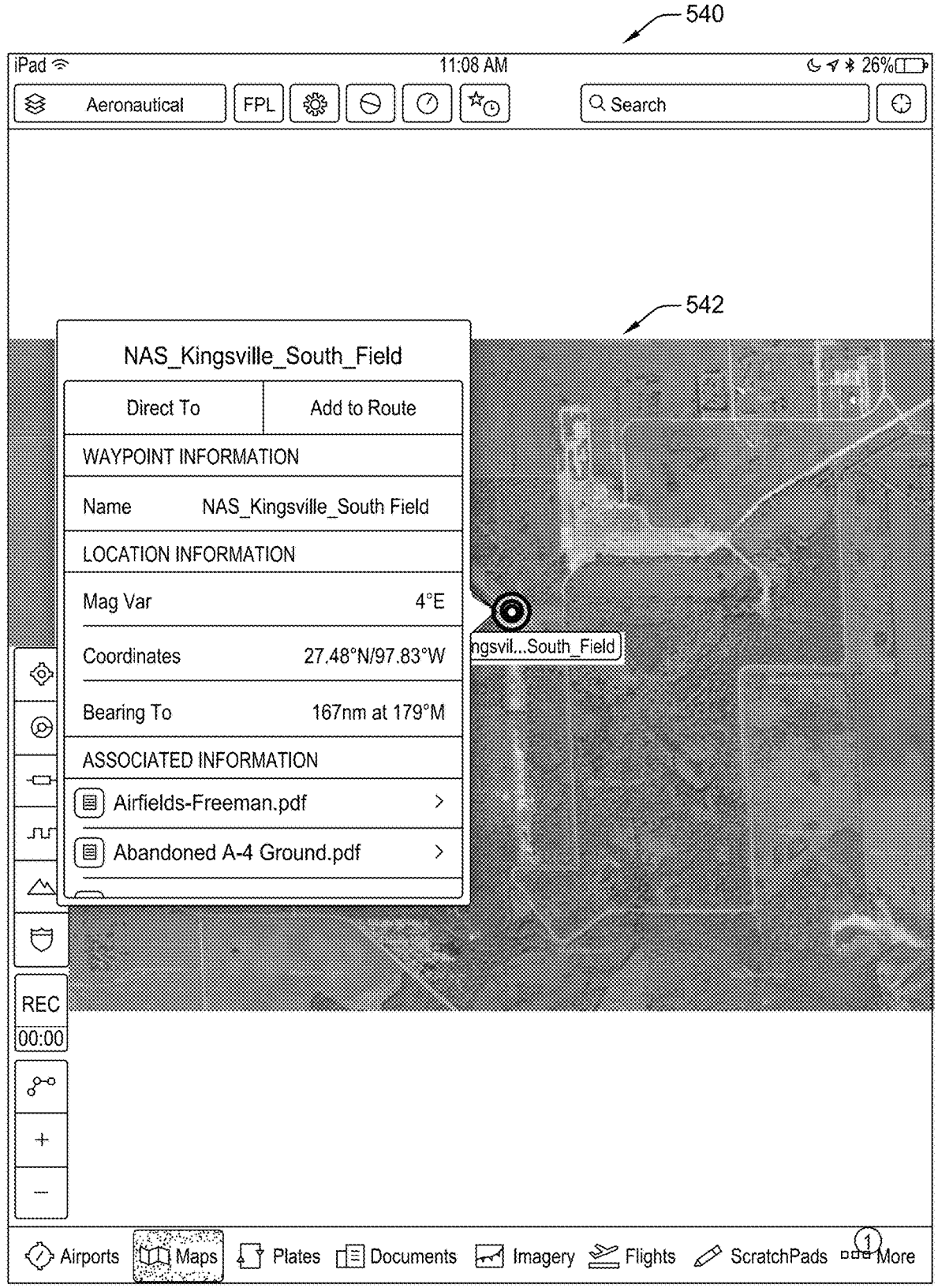
FIG. 5.4

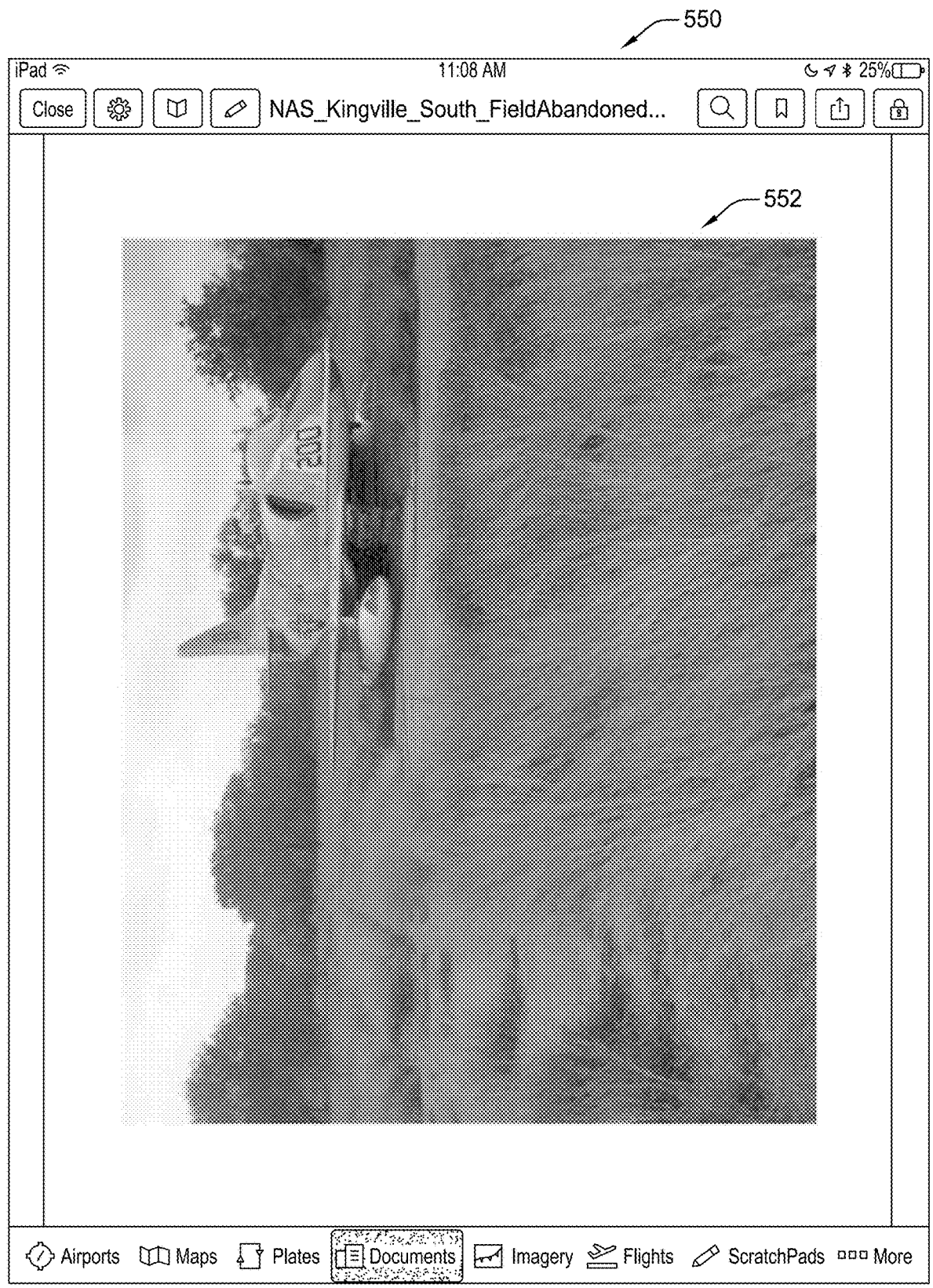
FIG. 5.5

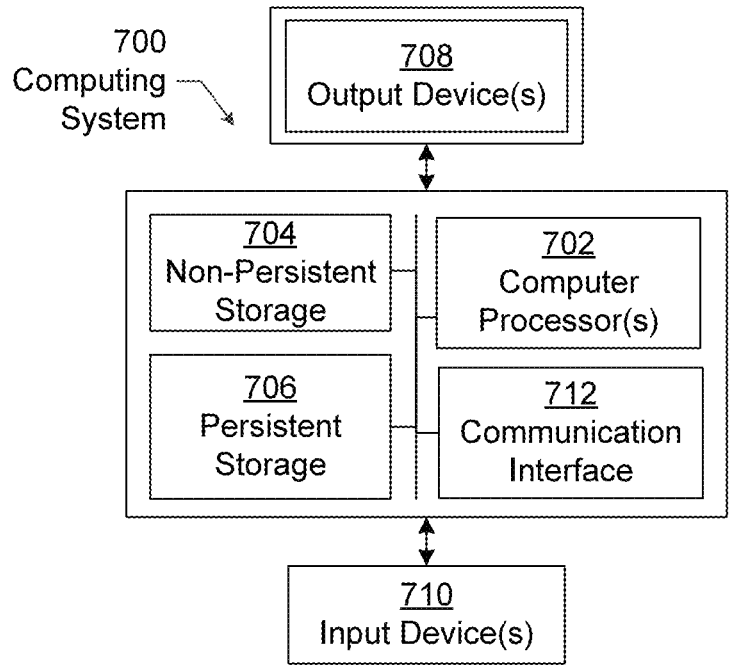
FIG. 7.1
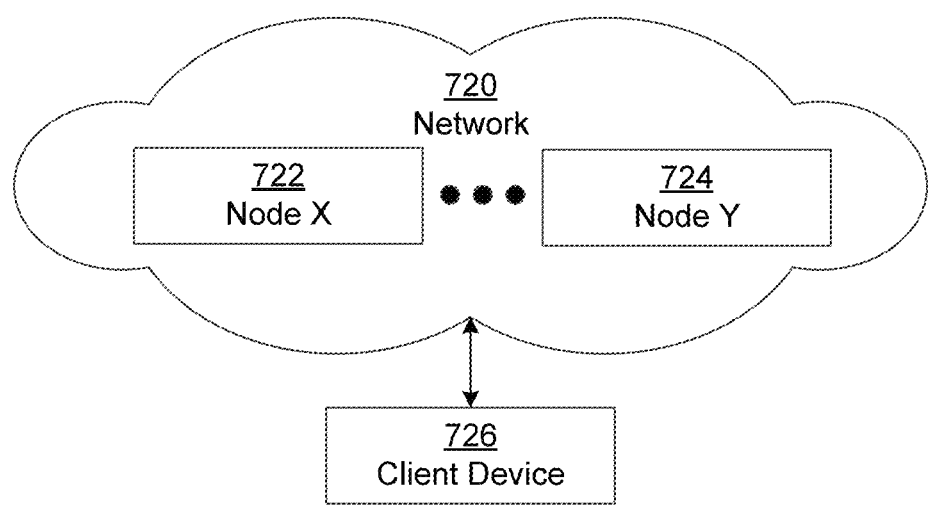
FIG. 7.2

BUNDLED DISTRIBUTION AND MANAGEMENT OF AERONAUTICAL DATA

BACKGROUND

Government agencies, such as the United States Federal Aviation Administration (FAA), provides public aeronautical information for airports, including aeronautical charts, obstacle data, and other information that is used by pilots to safely navigate and land an aircraft, such as an airplane, helicopter, or other mode of air transportation. The aeronautical information from a government agency may be referred to as public information.

Pilots may also use private information to supplement public information, or to use when flight information is not available. For example, the FAA does not maintain information about helicopter landing sites on private building such as hospitals. Thus, helicopter companies that provide services to hospitals may have a set of proprietary information that is used by the helicopter pilots that fly for the company. Similar to the public aeronautical information, proprietary aeronautical information may also include navigation charts, information about waypoint and obstacles. For a pilot, not having a piece of important aeronautical information when flying and under difficult conditions (e.g., low visibility) can lead to tragedy.

SUMMARY

In general, in one aspect, one or more embodiments relate to a method that includes obtaining, by a mobile flight application via a network, a content pack having aeronautical files, determining, by the mobile flight application, a set of waypoints in the content pack from the aeronautical files in the content pack, and relating, in a geolocation mapping structure, a waypoint with a matching subset of the aeronautical files in the content pack. The method further includes presenting, integrated into the corresponding sections of a user interface of the mobile flight application, the content pack while maintaining inseparability of the files in the mobile flight application.

In general, in one aspect, one or more embodiments relate to a system that includes storage configured to store a content pack, and a computer processor for executing a mobile flight application to perform operations. The operations include obtaining, by a mobile flight application via a network, a content pack having aeronautical files, determining, by the mobile flight application, a set of waypoints in the content pack from the aeronautical files in the content pack, and relating, in a geolocation mapping structure, a waypoint with a matching subset of the aeronautical files in the content pack. The operations further include presenting, integrated into the corresponding sections of a user interface of the mobile flight application, the content pack while maintaining inseparability of the files in the mobile flight application.

In general, in one aspect, one or more embodiments relate to a non-transitory computer readable medium that includes computer readable program code for performing operations. The operations include obtaining, by a mobile flight application via a network, a content pack having aeronautical files, determining, by the mobile flight application, a set of waypoints in the content pack from the aeronautical files in the content pack, and relating, in a geolocation mapping structure, a waypoint with a matching subset of the aeronautical files in the content pack. The operations further include presenting, integrated into the corresponding sections of a user interface of the mobile flight application, the content pack while maintaining inseparability of the files in the mobile flight application.

Other aspects of the invention will be apparent from the following description and the appended claims.

BRIEF DESCRIPTION OF DRAWINGS

FIG. 5.1, FIG. 5.2, FIG. 5.3, FIG. 5.4, and FIG. 5.5 show an example user interface in accordance with one or more embodiments of the invention.

FIG. 7.1 and FIG. 7.2 show a computing system in accordance with one or more embodiments of the invention.

DETAILED DESCRIPTION

Figure 1:
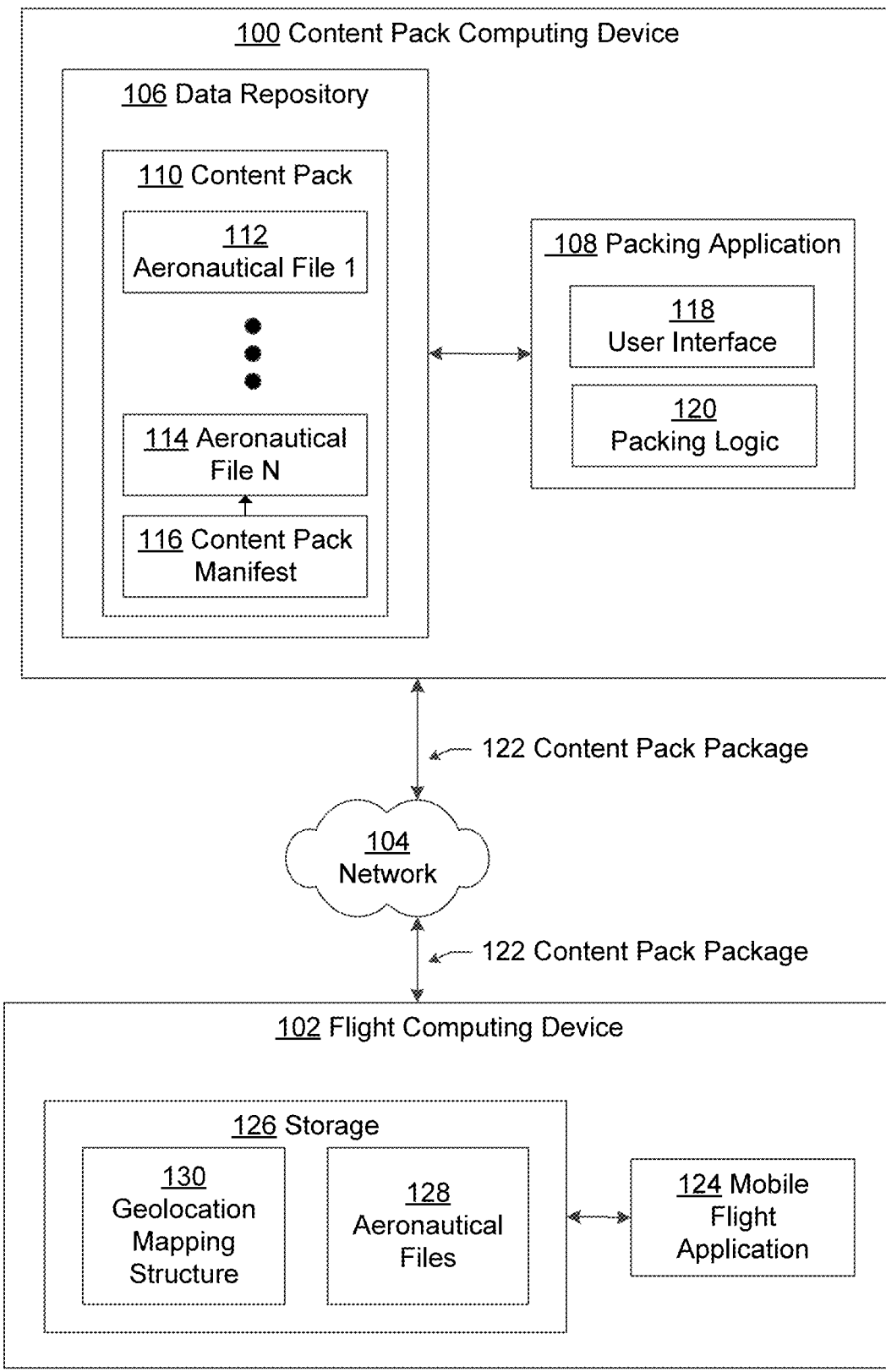
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to maintaining and disseminating content packs. A content pack is a set of interrelated aeronautical files that are to be managed together. One or more embodiments is directed to cohesive management of aeronautical files while integrating the aeronautical files into a flight application. The cohesive management keeps the aeronautical files together and interrelated. For example, one of the aeronautical files cannot be deleted without deleting the content pack. However, by integrating the content pack into the flight application, the various aeronautical files are located in the corresponding sections of the flight application and interspersed with aeronautical data from other aeronautical files.

FIG. 1 shows a diagram of a system in accordance with one or more embodiments of the invention. As shown in FIG. 1, a content pack computing device (100) is connected to one or more flight computing devices (102) via network (104). The various computing devices may be any type of computing device, such as the computing device shown in FIG. 7.1 and FIG. 7.2. Each of the components of FIG. 1 is described below.

The content pack computing device (100) is a computing device that generates and publishes content packs (e.g., content pack (110)). The content pack computing device (100) may include a data repository (106) and a packing application (108).

The data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site.

The data repository (106) includes functionality to store a content pack (110). The content pack (110) is a set of aeronautical files (e.g., aeronautical file 1 (112), aeronautical file N (114)) that is designated as being interrelated. Aeronautical files may include one or more files, each with a map layer, one or more files storing pictures, one or more files storing frequency information, one or more files storing obstruction information, and other types of aeronautical files. The aeronautical files may be in a variety of file formats. For example, the aeronautical files may include text files in formats such as Keyhole Markup Language (.KML) format, Geo spatial JavaScript Object Notation (GeoJSON) format, Comma Separated Values (.CSV), etc. The aeronautical files may include raster imagery files in Mapbox Tiles (.MBTiles) format, Text, Imagery, and Graphics files in Portable Document Format (.PDF), and graphics files in Georeferenced Portable Document Format (.PDF). Other types of files and file formats may be used without departing from the scope of the claims.

The set of aeronautical files have a shared attribute in one or more embodiments. For example, the shared attribute may be that the file is related to an abandoned airspace, that the file references an exclusive waypoint (e.g., landing locations, flyover points) of a company, that the file references a waypoint of a customer of the company, or another attribute. The content pack (110) may optionally further include a content pack manifest (116). The content pack manifest (116) stores metadata about the content pack, such as file name, version, year, and other information.

Figure 2:
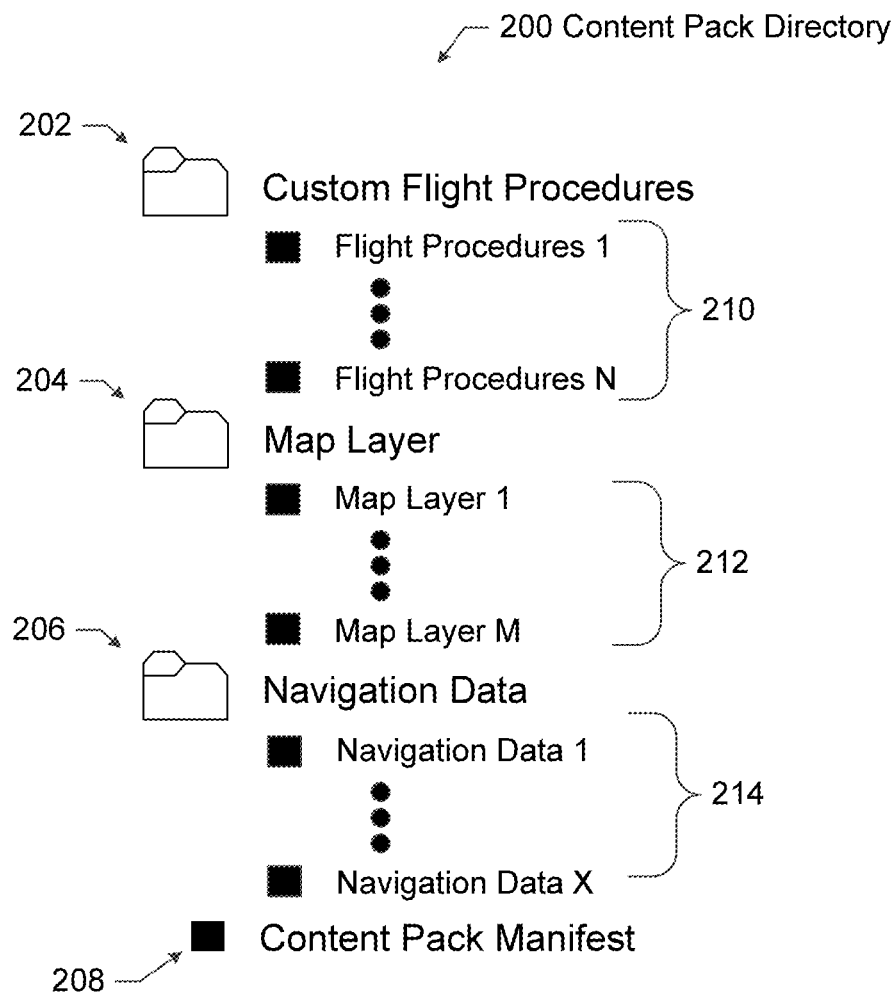
FIG. 2 shows a directory structure in accordance with one or more embodiments of the invention.

In one or more embodiments, the content pack (110) is stored in a directory structure having a defined file system hierarchy. An example of the content pack directory (200) is shown in FIG. 2. The content pack directory (200) is a folder for the content pack. The content pack directory (200) may include subfolders of a custom flight procedures subfolder (202), a map layers subfolder (204), a navigation data subfolder (206), and a content pack manifest (208). Because of the defined directory structure, the flight application (discussed below) may be populated with the content pack.

The custom flight procedures subfolder (202) includes flight procedures files (e.g., flight procedure 1 file, flight procedure N file) (210). Flight procedures may include instrument approach procedures that include path to a waypoint. The instrument approach procedures in the flight procedures files is used by pilots to keep clear of terrain and obstacles when the pilot cannot see out of window. In other words, the flight procedures may specify the obstacles and/or the path that avoids the obstacles. The flight procedures may further include information about approaches and/or departures to landing locations. The different files may be for different waypoints and for different procedures for the different waypoint. The flight procedure files may follow a naming scheme that includes a waypoint identifier and type of procedure.

The map layers subfolder (204) includes map layers files (e.g., map layer 1 file, map layers M file) (210). The map layers are graphical layers to overlay on a map view. The map view may be satellite view, street view, or other map view. The map layer files each provide a layer that adds points, lines, and shapes on the map. As such, each point, line, and shape match a geographical location. For example, the points may be private waypoints.

The navigation data subfolder (206) stores navigation data files (e.g., navigation data 1 file, navigation data X file) (214). The navigation data file may include route data. For example, the navigation data may include waypoints, such as route to waypoints. Navigation data may also include documents associated with a particular waypoint. Thus, the content pack provide a mechanism to have a waypoint that is not maintained by a federal or local government agency, keep additional information about that waypoint.

In one or more embodiments, the content pack manifest (208) stores information about the content pack as a whole. For example, the content pack manifest may include one or more of the following a name of the content pack, an abbreviated name of the content pack, a version number of the content pack, a name of an organization that generated the content pack, and an expiration date by which the content pack is no longer valid (i.e., should not be used). The manifest file is optional. The manifest file is optional in some embodiments, and the information therein is presented to a user if the manifest exists.

Returning to FIG. 1, the packing application (108) is a software application that is connected to the data repository (106). For example, the packing application (108) may be a web application, an applet, a local application, or another type of software application. The packing application (108) may include a user interface (118) and packing logic (120). The user interface (118) includes functionality to receive a content pack. For example, the user interface (118) may include graphical user interface widgets for the user to specify a location of the content pack directory of a particular content pack. The user interface (118) may further include various graphical user interface widgets to assist a user to generate a content pack. For example, the user interface may include drag and drop functionality to drop aeronautical files into corresponding categories of aeronautical files. The packing logic (108) may include functionality to generate a content pack based on selections of aeronautical files from a user. The packing logic (108) may further include functionality to create a content pack package (122) from the directory structure.

The content pack computing device (100) is connected via a network (104) to one or more flight computing device (102). The network (104) may be the same or similar to the network discussed below with reference to FIG. 7.1 and FIG. 7.2.

The flight computing device (102) is a computing device that does inflight management of a flight. The flight computing device (102) is a mobile computing device in that the flight computing device moves with the aircraft (e.g., helicopter, airplane, or other air mode of transportation). For example, the flight computing device (102) may be installed in the aircraft, may be a mobile phone, may be a tablet personal computer, or other computing device.

The flight computing device (102) executes a mobile flight application (124). The mobile flight application (124) includes functionality to gather and present (e.g., display, transmit audio signals, or otherwise provide to the user) flight information before and/or after the flight as well as during the flight. For example, the mobile flight application may be configured to interface with a user to plan flights and/or to select routes. The selected routes may then be displayed on maps in the user interface (not shown) of the mobile flight application. The mobile flight application includes a graphical user interface (not shown) with a variety of views (not shown). For example, a map view shown in the graphical user interface may be a moving map for air and/or ground operations that include an own-ship display indicting the current position of the aircraft on the moving map as the flight is progressing. A document view shows documents associated with a waypoint. A package selection view is configured to display a list of content packs and information about the content packs. A waypoint view shows information about a particular selected waypoint. Other views may be included in the flight application. Each view corresponds to a section of the mobile flight application. The mobile flight application (124) is configured to integrate a content pack into the various distinct section while maintaining inseparability of the aeronautical files in the content pack. For example, map layers of the content pack are integrated into the map view while documents of the content pack associated with a waypoint are integrated into a document view. Through the inseparability, the pilot cannot delete an aeronautical file of the content pack without deleting the entire content pack. Thus, the deletion of a single file is not accidental. If the pilot has a content pack, then the pilot has the entire content pack. Thus, the aeronautical files in the content pack are jointly managed. Example user interfaces are presented in FIGS. 5.1-5.5 and FIG. 6.

The mobile flight application (124) is connected to storage (126). For example, the storage may be physical storage. As another example, the storage (126) may be the same or similar to the data repository (106). The storage (126) stores copies of aeronautical files (128). The copies of the aeronautical files (128) are copies of the aeronautical files in the content pack (110). The geolocation mapping structure (130) maintains a mapping relationship between geological locations and aeronautical files. For example, the geolocation mapping structure (130) may match waypoints to documents in the aeronautical files. The geolocation mapping structure (130) may further match extents of the map layer files to geolocations. Although not shown in FIG. 1, the mobile flight application (124) may include additional mapping structures.

While FIGS. 1 and 2 show a configuration of components, other configurations may be used without departing from the scope of the invention. For example, various components may be combined to create a single component. As another example, the functionality performed by a single component may be performed by two or more components.

Figure 3:
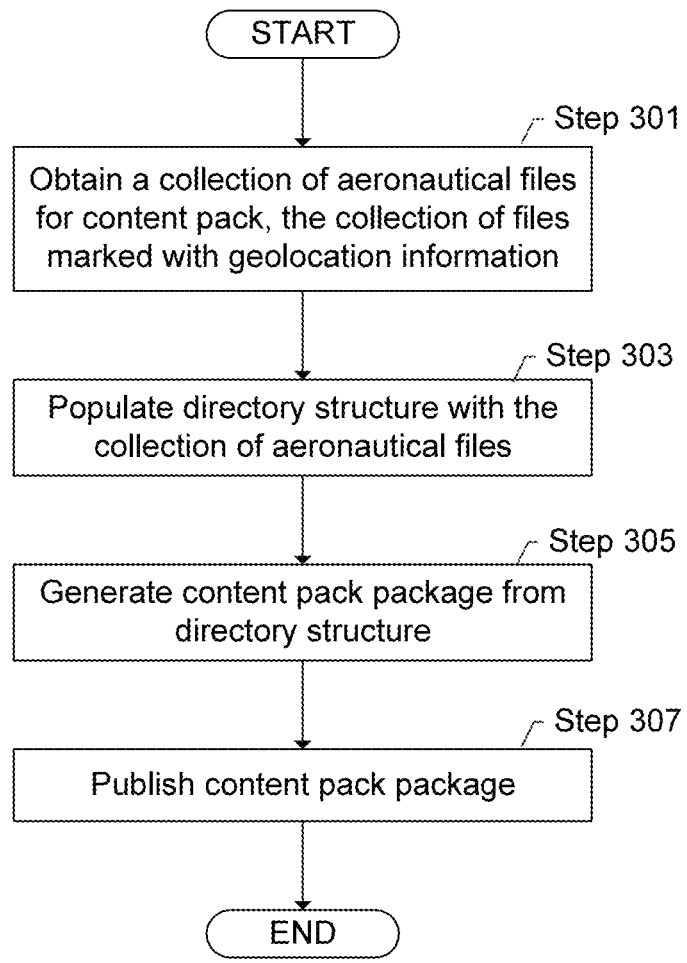
FIG. 3 and FIG. 4 show flowcharts in accordance with one or more embodiments of the invention.
Figure 4:
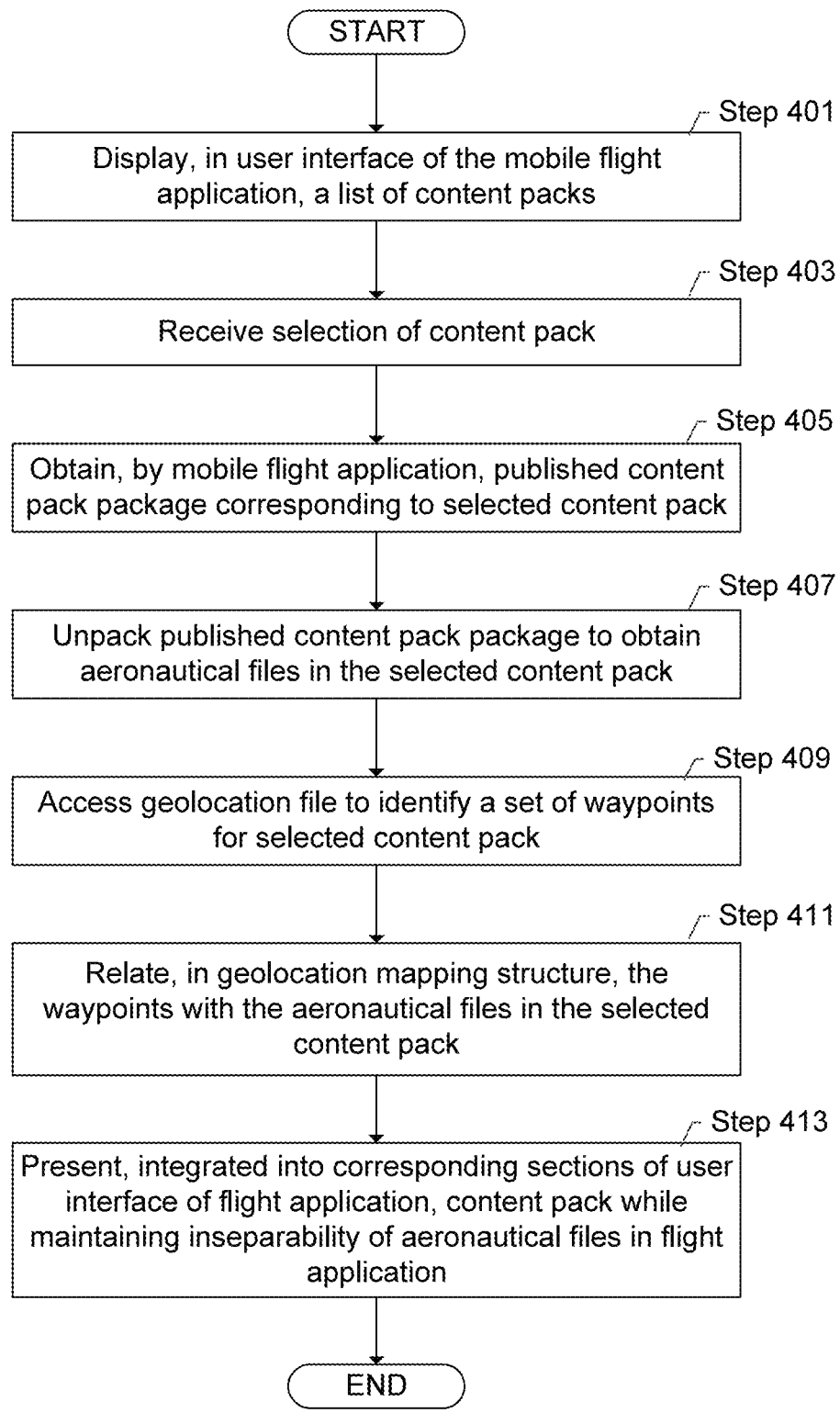

FIGS. 3 and 4 present flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for generating a content pack. For example, the steps of FIG. 3 may be performed by the content pack computing device. In Step 301, a collection of aeronautical files for the content pack is obtained. The collection of aeronautical files is marked with geolocation information. In one or more embodiments, aeronautical files related to a particular waypoint are named according to the waypoint. Aeronautical files that are related to multiple locations may have a variety of geolocation information within the body of the file. In one or more embodiments, the geolocation information may be in the metadata of the aeronautical file.

In Step 303, a directory structure is populated with the collection of aeronautical files. As an aeronautical file is obtained, the aeronautical file is added to the corresponding subfolder of the directory structure. The adding of the aeronautical file may be performed automatically by the packing application or by a user. For example, the packing application may guide the user through submitting the category of the aeronautical file. As another example, the packing application may scan the contents of the aeronautical file and determine the location of the aeronautical file in the directory structure based on the contents. In the example, the file type, metadata, type of contents (images, lists, graphics), and/or keywords are indicative of the category of aeronautical file and, subsequently the subfolder. Rather than a directory structure, the aeronautical file may be otherwise marked with the category of the folder.

In Step 305, a content pack package is generated from the directory structure. In some embodiments, the content pack package is generated by creating an archived file from the directory structure. For example, the directory structure may be zipped to obtain the content pack package. As another example, the content pack package may be generated by creating a document or other specification that links to the various aeronautical files in the content pack.

In Step 307, the content pack package is published. Publication may include adding the content pack to a list of available content packs, whereby the list is exposed to one or more flight computing devices. As another example, publication may include transmitting the content pack package to one or more flight computing devices. Other methods for publishing the content pack package may be used.

FIG. 4 shows a flowchart for the flight computing device to obtain and use the content pack. In Step 401, in the user interface of the mobile flight application, a list of content packs is obtained in one or more embodiments. The graphical user interface of the flight application may display the list of names of the available content packs. The list may further include information from the content pack manifest. When the user selects a content pack from the list, the information may be obtained for the selected content pack. Further, in one or more embodiments, the names of the aeronautical files are displayed as contents of the content pack.

In Step 403, a selection of a content pack is received. The user selects a content pack from the list of content packs.

In Step 405, the mobile flight application obtains a published content pack package corresponding to the selected content pack. Specifically, in response to the selection, the published content pack is requested from the content pack computing device. In some embodiments, the content pack package is automatically obtained from the content pack computing device. The publication of the content pack may include transmission to the respective flight computing devices. For example, a company may automatically disseminate content packs to pilots that work for the company. In such a scenario, Steps 401 and 403 may be omitted.

In Step 407, the published content pack package is unpacked to obtain aeronautical files in the selected content pack. The unpacking may be to unarchive an archived file having the content pack. For example, the mobile flight application unzips the folder and sends each aeronautical file to where the aeronautical file belongs in the storage of the flight application. At this stage, the only delete option is for the content pack as a whole. As another example, the unpacking may be to obtain the individual aeronautical files in the content pack based on references to the individual aeronautical files.

Steps 405 and 407 may precede Step 401. In particular, prior to presenting the list and receiving the selection, the published content pack packages may be obtained and unpacked. For example, published content pack packages may be distributed to the respective flight computing device (s) and unpacked before the list is presented to a user.

In Step 409, a set of waypoints for the selected content pack is determined. In one or more embodiments, the set of waypoints is determined from the file names of the aeronautical files. Coordinates of new waypoints may be determined from a geolocation file. Existing waypoints have known mappings between coordinates of waypoints and the waypoints names. In Step 411, in the geolocation mapping structure, the waypoints are related with the aeronautical files in the selected content pack. The unpacking causes the files beginning with the same waypoint identifier to be associated with each other in storage. The embedded logic then associates any aeronautical file with the prefix to that particular waypoint on the map. In the user interface, the prefix is then truncated off of the map. Specifically, the names of the aeronautical files may be truncated names. For example, the aeronautical files may be named with the particular waypoint and other information for the purposes of extracting information from the content packs. The waypoint identifier is truncated off in the user interface of the flight application.

In Step 413, the content pack is presented integrated into the corresponding sections of the flight application while maintaining inseparability of the aeronautical files in the flight application. Specifically, even though the information from the aeronautical files are accessible in the various distinct user interface views or sections of the user interface of the flight application, the underlying aeronautical files cannot be deleted except as a whole content pack. This means that if pilots are in the air in a low visibility setting, they do not accidently lose a portion of important information needed to safely land.

The following examples are for explanatory purposes only and not intended to limit the scope of the invention.

FIG. 5.1, FIG. 5.2, FIG. 5.3, FIG. 5.4, and FIG. 5.5 show an example user interface in accordance with one or more embodiments of the invention. FIG. 5.1 may be an example user interface of the mobile flight application, the packing application, or an underlying operating system. FIG. 5.2, FIG. 5.3, FIG. 5.4, and FIG. 5.5 show the user interface of the mobile flight application.

FIG. 5.1 shows a folder structure (500) of an example content pack. As shown in FIG. 5.1, the content pack is for abandoned airfields, which are not maintained by the FAA. The subfolder byop (502) provides the set of flight procedures. The sub-folder layers (504) provides map layers. The sub-folder navdata (506) includes navigation data. Additionally, the folder structure (500) includes manifest.json, which provides a content pack manifest for the content pack. As shown in FIG. 5.1, one of the landing locations is NAS_Kingsville, which has a set of aeronautical files.

FIG. 5.2 shows a user interface view of the mobile flight application (516). The user interface in FIG. 5.2 shows a detailed view of the content pack corresponding to the folder structure of FIG. 5.1. One level up from FIG. 5.2 shows the various content packs available. Viewing the top right pane (518), the user in the flight application can see the name of the content pack, the version, the organization name, file name (matching the top level directory), and the date added is the date that the content pack is added to the user's version of the flight application. The various information in the top box may be populated by the flight application using the content pack manifest.

The package contents pane (520) shows the aeronautical files in the content pack. The flight application does not allow deletion of individual files of the content pack. Rather, the delete button (522) is for the content pack in the entirety of the content pack.

FIG. 5.3 shows a map user interface view (526) of the mobile flight application. With the abandoned airfield layer (528) from the content pack is selected, the grey dot and grey layer NAS Kingsville airfield (530) and Alexander airfield are displayed. The selection of the abandoned airfield layer (528) turns on the routable elements. The list on the left allows for the selection of layers of the flight application. In other words, by selecting on the list on the left, layers may be shown or hidden from the map.

Individual files in the content pack can be viewed individually. At least some of the files have layers of information to overlay on a map. Thus, pilots can show or hide layers, where is layer is denoted by an individual file. However, a pilot cannot delete individual files in the content pack. A file may have information that extends beyond the currently viewed area of the map, and that is accordingly not shown in the map.

FIG. 5.4 shows a user interface view of the mobile flight application (540) with the MV tiles found in the layers folder for the NAS Kingsville South Field map from the content pack of FIG. 5.1. The associated information shows the PDF files in the Navigation folder. The file name and the presence in the same folder associates the file with the particular airfield. Selecting an item in the document on the map allows for display of the document.

FIG. 5.5 shows the user interface view (550) of the mobile flight application when the pilot selects the file with the Kingsville South Field airport. As shown, a picture of the airport (552) is displayed in the interface. Thus, the pilot can see the landing conditions of the airport.

Figure 6:
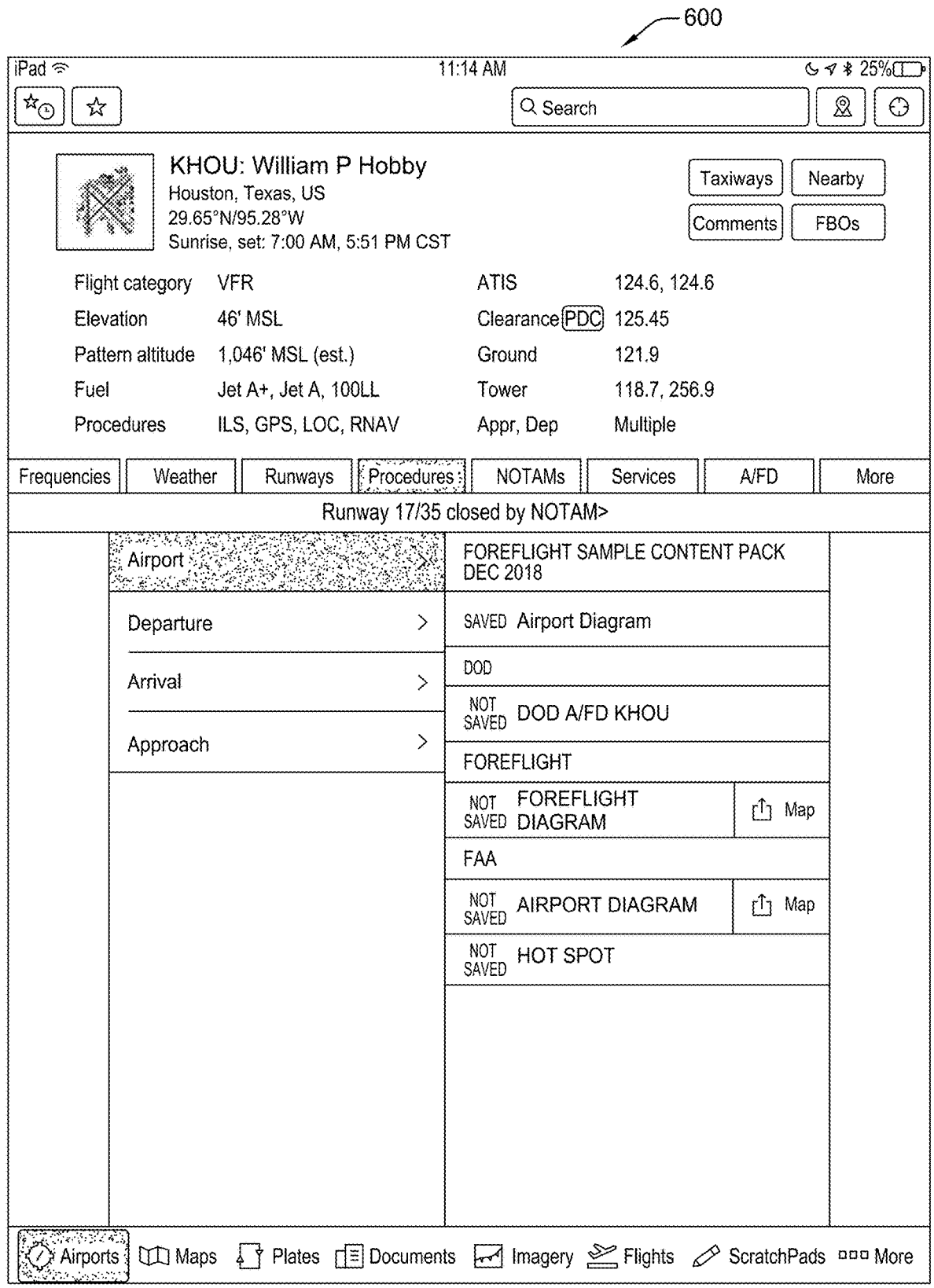
FIG. 6 shows an example user interface of a flight application in accordance with one or more embodiments.

FIG. 6 shows an example user interface of the mobile flight application (600) in accordance with one or more embodiments. One or more embodiments also allows for content packs to associate a file with an existing waypoint, such as an airport that has FAA data. As shown in FIG. 6, the content pack includes an airport diagram and a hotspot diagram. The content pack name is Sample Content Pack December 2018. The same content pack may have the same underlying folder structure as described above but associated with an existing waypoint.

By way of an example use, helicopter companies in the United States operate out of a variety of locations. The helicopter companies often have contracts with hospitals and other companies for providing helicopter services. The data about landing at the various locations are not maintained by the federal aviation administration (FAA). Rather, the helicopter companies need to maintain their own databases of information with procedures for pilots to follow. The procedures include radio frequencies to use, lighting available, maps, obstructions nearby, etc. The mobile flight application provides various features to accommodate that need including content packs. Content Packs enable the different types of geospatial data and bundle into a single package. Thus, a pilot can pick a point on map and get the document. While the pilot may delete entire package, the pilot does not lose a single file in the process of landing at the hospital or other landing location.

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the invention, may perform data comparison. Data comparison may be used to compare two or more data values (e.g., A, B). For example, one or more embodiments may determine whether $A>B$, $A=B$, $A\mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting systems. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio systems. In particular, data may be rendered into an audio format and presented as sound through one or more speakers operably connected to a computing device.

Data may also be presented to a user through haptic systems. For example, haptic systems may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining, by a mobile flight application via a network, a content pack comprising a plurality of aeronautical files;
   determining, by the mobile flight application, a set of waypoints in the content pack from the plurality of aeronautical files in the content pack;
   relating, in a geolocation mapping structure, a waypoint with a matching subset of the aeronautical files in the content pack; and
   presenting, integrated into the corresponding sections of a user interface of the mobile flight application, the content pack while maintaining inseparability of the plurality of files in the mobile flight application.

2. The method of claim 1, further comprising:
   displaying, in the user interface of the mobile flight application, a list of content packs; and
   receiving a selection of the content pack from the list of the content packs.

3. The method of claim 1, wherein obtaining the content pack comprises obtaining a published content pack package, and wherein the method further comprises:
   unpacking the published content pack package to obtain the plurality of aeronautical files.

4. The method of claim 3, wherein the published content pack package is a published archived file.

5. The method of claim 1, further comprising:
   truncating a portion of the file name of the aeronautical file matching a geolocation of contents of the aeronautical file to obtain a truncated name; and
   presenting the truncated name for the aeronautical file in response to a selection of the geolocation on a map displayed in the user interface.

6. The method of claim 1, further comprising:
   receiving a selection to delete the content pack;
   identifying the plurality of aeronautical files as being part of the content pack in response to the selection; and
   deleting each of the plurality of aeronautical files in response to the selection.

7. The method of claim 1, further comprising:
   obtaining a plurality of aeronautical files for the content pack, the plurality of aeronautical files marked, using a file naming convention of the plurality of aeronautical files, with geolocation information;
   populating a directory structure with the plurality of aeronautical files;
   generating a content pack package from the directory structure; and
   publishing the content pack package.

8. The method of claim 7, wherein the directory structure comprises:
   a custom flight procedures folder comprising a first subset of the plurality of aeronautical files, the first subset comprising custom flight procedures;
   a map layer folder comprising a second subset of the plurality of aeronautical files, the second subset comprising visualization layers for an aeronautical map; and a navigation data folder comprising a third subset of the plurality of aeronautical files, the third subset comprising navigation data.

9. The method of claim 1, wherein the directory structure comprises:
a content pack manifest comprising metadata about the content pack.

10. A system comprising:
storage configured to store a content pack; and
a computer processor for executing a mobile flight application to perform operations comprising:
storing the content pack comprising a plurality of aeronautical files in storage, the content pack obtained from a content pack computing device via a network;
determining a set of waypoints in the content pack from the plurality of aeronautical files in the content pack;
relating, in a geolocation mapping structure, a waypoint with a matching subset of the aeronautical files in the content pack; and
presenting, integrated into the corresponding sections of a user interface of the mobile flight application, the content pack while maintaining inseparability of the plurality of files in the mobile flight application.

11. The system of claim 10, the operations further comprising:
truncating a portion of the file name of the aeronautical file matching a geolocation of contents of the aeronautical file to obtain a truncated name; and
presenting the truncated name for the aeronautical file in response to a selection of the geolocation on a map displayed in the user interface.

12. The system of claim 10, the operations further comprising:
receiving a selection to delete the content pack;
identifying the plurality of aeronautical files as being part of the content pack in response to the selection; and
deleting each of the plurality of aeronautical files in response to the selection.

13. The system of claim 12, wherein the directory structure comprises:
a custom flight procedures folder comprising a first subset of the plurality of aeronautical files, the first subset comprising custom flight procedures;
a map layer folder comprising a second subset of the plurality of aeronautical files, the second subset comprising visualization layers for an aeronautical map; and
a navigation data folder comprising a third subset of the plurality of aeronautical files, the third subset comprising navigation data.

14. The system of claim 10, wherein the directory structure comprises:
a content pack manifest comprising metadata about the content pack.

15. A non-transitory computer readable medium comprising computer readable program code for performing operations, the operations comprising:

obtaining, by a mobile flight application via a network, a content pack comprising a plurality of aeronautical files;
determining, by a mobile flight application, a set of waypoints in the content pack from the plurality of aeronautical files in the content pack;
relating, in a geolocation mapping structure, a waypoint with a matching subset of the aeronautical files in the content pack; and
present, integrated into the corresponding sections of a user interface of the flight application, content pack while maintaining inseparability of the plurality of files in the mobile flight application.

16. The non-transitory computer readable medium of claim 15, the operations further comprising:
truncating a portion of the file name of the aeronautical file matching a geolocation of contents of the aeronautical file to obtain a truncated name; and
presenting the truncated name for the aeronautical file in response to a selection of the geolocation on a map displayed in the user interface.

17. The non-transitory computer readable medium of claim 15, the operations further comprising:
receiving a selection to delete the content pack;
identifying the plurality of aeronautical files as being part of the content pack in response to the selection; and
deleting each of the plurality of aeronautical files in response to the selection.

18. The non-transitory computer readable medium of claim 15, the operations further comprising:
obtaining a plurality of aeronautical files for the content pack, the plurality of aeronautical files marked, using a file naming convention of the plurality of aeronautical files, with geolocation information;
populating a directory structure with the plurality of aeronautical files;
generating a content pack package from the directory structure; and
publishing the content pack package.

19. The non-transitory computer readable medium of claim 18, wherein the directory structure comprises:
a custom flight procedures folder comprising a first subset of the plurality of aeronautical files, the first subset comprising custom flight procedures;
a map layer folder comprising a second subset of the plurality of aeronautical files, the second subset comprising visualization layers for an aeronautical map; and
a navigation data folder comprising a third subset of the plurality of aeronautical files, the third subset comprising navigation data.

20. The non-transitory computer readable medium of claim 15, wherein the directory structure comprises:
a content pack manifest comprising metadata about the content pack.

* * * * *

UNITED STATES PATENT AND TRADEMARK OFFICE
CERTIFICATE OF CORRECTION

Page 1 of 2

PATENT NO. : 10,929,355 B1
APPLICATION NO. : 16/714352
DATED : February 23, 2021
INVENTOR(S) : Charles Gehin-Scott, Jr. et al.

It is certified that error appears in the above-identified patent and that said Letters Patent is hereby corrected as shown below:

In the Claims

Claim 1, Column 14, Line 18, the words -- plurality of -- should be inserted between the words "the" and "aeronautical".

Claim 5, Column 14, Line 37, the word "the", between the words "of" and "file", should read -- a --.

Claim 5, Column 14, Line 37, the word "the", between the words "of" and "aeronautical", should read -- an --.

Claim 7, Column 14, Line 50, the word "a", between the words "obtaining" and "plurality", should read -- the --.

Claim 9, Column 15, Line 4, the number "1" should read -- 7 --.

Claim 10, Column 15, Line 19, the words -- plurality of -- should be inserted between the words "the" and "aeronautical".

Claim 11, Column 15, Line 27, the word "the", between the words "of" and "file", should read -- a --.

Claim 11, Column 15, Line 27, the word "the", between the words "of" and "aeronautical", should read -- an --.

Claim 13, Column 15, Line 40, the word "the", between the words "wherein" and "directory", should read -- a --.

Claim 14, Column 15, Line 52, the word "the", between the words "wherein" and "directory", should read -- a --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,929,355 B1

Claim 15, Column 16, Line 8, the words -- plurality of -- should be inserted between the words "the" and "aeronautical".

Claim 15, Column 16, at the beginning of Line 10, the word "present" should read -- presenting --.

Claim 15, Column 16, Line 11, the word -- the -- should be inserted before the word "content".

Claim 16, Column 16, Line 16, the word "the", between the words "of" and "file", should read -- a --.

Claim 16, Column 16, Line 16, the word "the", between the words "of" and "aeronautical", should read -- an --.

Claim 18, Column 16, Line 31, the word "a", between the words "obtaining" and "plurality", should read -- the --.

Claim 20, Column 16, Line 53, the number "15" should read -- 18 --.